(12) United States Patent
Michaelsen

(10) Patent No.: US 7,082,468 B1
(45) Date of Patent: Jul. 25, 2006

(54) METHOD AND APPARATUS FOR FLEXIBLE HIGH SPEED COMMUNICATION

(75) Inventor: Aly Aarestrup Michaelsen, Farum (DK)

(73) Assignee: Intel Corporation, Santa Clara, CA (US)

( * ) Notice: Subject to any disclaimer, the term of this patent is extended or adjusted under 35 U.S.C. 154(b) by 507 days.

(21) Appl. No.: 09/608,988

(22) Filed: Jun. 30, 2000

(51) Int. Cl.
*G06F 15/16* (2006.01)

(52) U.S. Cl. .................. 709/230; 709/231; 709/232

(58) Field of Classification Search ............... 709/230, 709/231, 232, 239
See application file for complete search history.

(56) References Cited

U.S. PATENT DOCUMENTS

| | | | |
|---|---|---|---|
| 5,444,782 A | | 8/1995 | Adams, Jr. et al. |
| 5,550,803 A | * | 8/1996 | Crayford et al. ............ 370/246 |
| 5,835,738 A | * | 11/1998 | Blackledge et al. ........ 710/307 |
| 5,953,340 A | * | 9/1999 | Scott et al. .................. 370/401 |
| 6,047,333 A | | 4/2000 | Roussel |
| 6,356,095 B1 | | 3/2002 | Komoriya |
| 6,356,905 B1 | | 3/2002 | Gershman et al. |
| 2001/0033650 A1 | * | 10/2001 | Wilson et al. ............... 379/398 |
| 2002/0006136 A1 | * | 1/2002 | Mallory et al. ............. 370/466 |

FOREIGN PATENT DOCUMENTS

| | | |
|---|---|---|
| EP | 0 841 782 A1 | 5/1998 |
| WO | WO 00/05853 | 2/2000 |
| WO | WO 00/30262 | 5/2000 |
| WO | WO 00/38330 | 6/2000 |
| WO | WO 02/03655 A2 | 1/2002 |
| WO | WO 02/03655 A3 | 1/2002 |

* cited by examiner

*Primary Examiner*—Arid Etienne
*Assistant Examiner*—Barbara Burgess
(74) *Attorney, Agent, or Firm*—Blakely, Sokoloff, Taylor & Zafman LLP

(57) ABSTRACT

Two data communication platforms are operating as a combination. In one embodiment, a data signal formatted according to a data communication protocol is received at a first data communication platform. The first data communication platform operates to determine if the data communication protocol is supported by the first data communication platform. If it is determined that the data communication protocol is supported by the first data communication platform, the first data communication platform indicates to a second data communication platform to receive the data signal at a by-pass path of a filter engine. As a result, fast data signal communication capabilities of protocols developed and implemented as ASICs are combined with the flexibility in developing and adding new protocols implemented as software needed by more complex networked computer devices. In one embodiment, a second data signal formatted according to a second data communication protocol is received at the first data communication platform. The first data communication platform operates to determine if the second data communication protocol is supported by the second data communication platform. If it is determined that the data communication protocol is supported by the second data communication platform, the first data communication platform indicates to the second communication platform to receive the data signal at a filter engine path of the filter engine.

14 Claims, 5 Drawing Sheets

METHOD AND APPARATUS FOR FLEXIBLE HIGH SPEED COMMUNICATION

FIELD OF THE INVENTION

The present invention pertains to the field of electronic devices. More particularly, this invention relates network communications.

BACKGROUND

As more computer devices are networked, communication between the computer devices have become faster. Faster communication involve transmitting and receiving larger amounts of data signals between networked computer devices. Often, these data signals are divided into packets for communication onto a network by a data communication platform. The packets usually contain information relating to the handling and managing of the data signals. Handling and managing of the data signals may include information such as destination, origin, and other details of how to handle the data signals.

Standards have been developed and included in the packets to allow the data communication platform to handle and manage data signals in a predetermined manner. There are a great number of these standards, known as protocols. However, due to increasing complexity of networked computer devices, new protocols are continually being developed.

The protocols may be developed and implemented in software, thereby allowing the protocols to be less related to particular networked computer devices and more universal. Additionally, protocols developed and implemented in software allow for flexibility in developing and adding new protocols as needed by more complex networked computer devices.

The protocols may also be developed and implemented in hardware. For example, the protocols may be developed and implemented using application specific integrated circuits (ASICs). Because ASICs are designed in hardware for a specific purpose, they do not need to retrieve and execute stored instructions. As a result, ASICs usually provide faster, but less flexible, data signal communication between networked computer devices as compared to protocols developed and implemented in software.

Even though protocols developed and implemented in ASICs provide faster data signal communication between networked computer devices as compared to protocols developed and implemented in software, the time required for manufacture and the inflexibility of ASICs lead some to utilize protocols developed and implemented in software for data communication between networked devices, which provides slower, but more flexible, data communication.

BRIEF DESCRIPTION OF THE DRAWINGS

The present invention is illustrated by way of example and not by way of limitation in the figures of the accompanying drawings, in which the like references indicate similar elements and in which.

DETAILED DESCRIPTION OF THE INVENTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

As discussed more fully below, the present invention provides a way to utilize protocols developed and implemented in application specific integrated circuits (ASICs) providing faster data signal communication between networked computer devices along with protocols developed and implemented in software providing faster and more flexible updating of protocols.

In general, embodiments of the present invention combine fast data signal communication capabilities of protocols developed and implemented in ASICs with the flexibility in developing and adding new protocols developed and implemented in software as needed by more complex networked computer devices.

Figure 1:
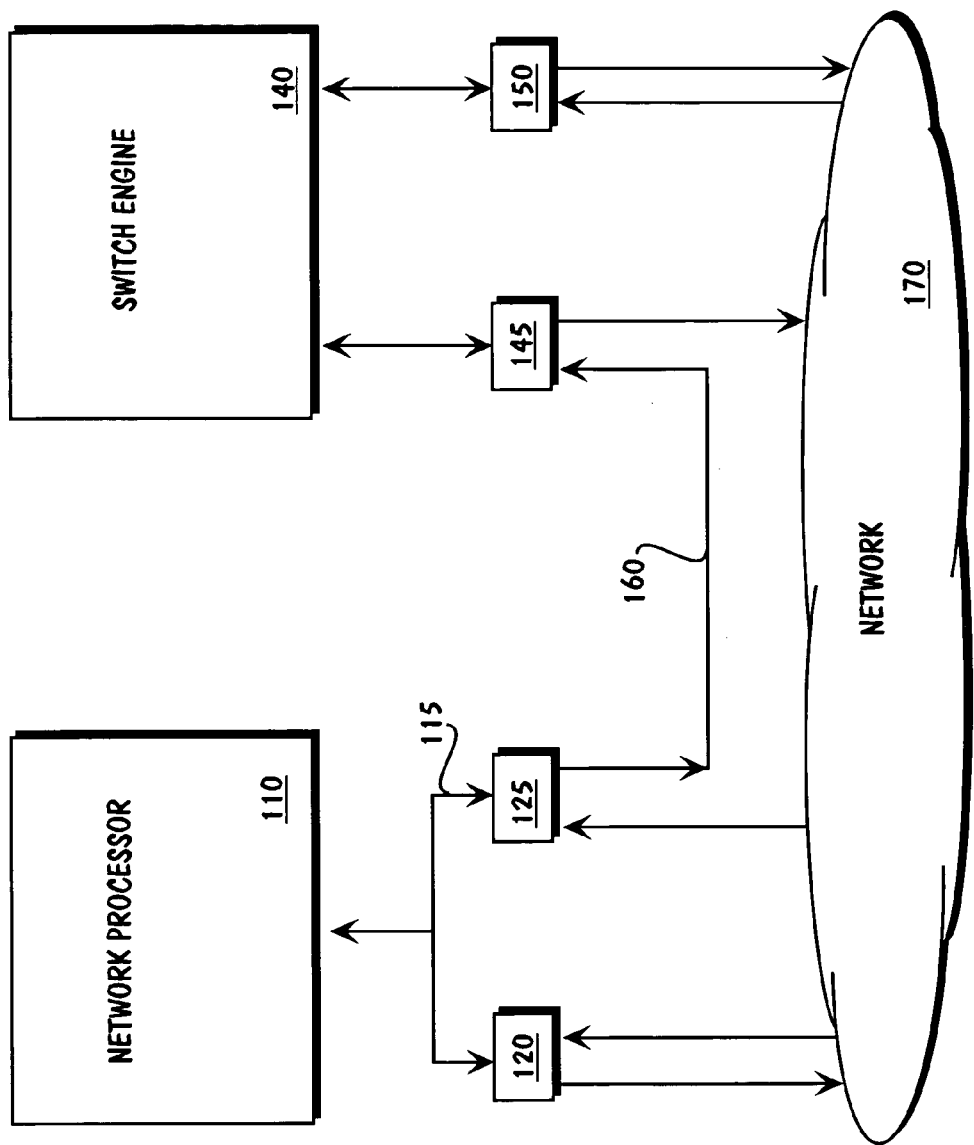
FIG. 1 illustrates a block diagram of one embodiment of the present invention for utilizing both protocols developed and implemented in ASICs to provide fast data signal communication capabilities and protocols developed and implemented in software to provide flexibility in developing and adding new protocols as need by more complex networked computer devices.

FIG. 1 illustrates a block diagram of one embodiment of the present invention for utilizing both protocols developed and implemented in ASICs to provide fast data signal communication capabilities and protocols developed and implemented in software to provide flexibility in developing and adding new protocols as need by more complex networked computer devices. In FIG. 1, a first data communication platform 110 and a second data communication platform 140 are shown. In the one embodiment of FIG. 1, the first data communication platform 110 may be a network processor utilizing protocols developed and implemented in software allowing for flexibility in developing and adding new protocols. Also in the one embodiment, the second data communication platform 140 may be a network switch engine utilizing protocols developed and implemented in ASICs providing faster, but less flexible, data signal communication as compared to protocols developed and implemented in software.

The first data communication platform 110 is connected to a network 170 through network data communication ports 120 and 125, and from the network 170 to networked computer devices (not shown). Commonly, the network data communication ports 120 and 125 transmit and receive data signals formatted according to a data communication protocol from the network 170. The network data communication ports 120 and 125 further transmit and receive data signals from the first data communication platform 110 through a bus 115.

The second data communication platform 140 is also connected to the network 170 through network data communication ports 145 and 150, and from the network 170 to networked computer devices (not shown). Commonly, the network data communication ports 145 and 150 may transmit and receive data signals from the second data communication platform 140 directly for transmission and reception of data signals formatted according to a data communication protocol from the network 170.

Shown in FIG. 1, an interface connection 160 couples the first data communication platform 110 with the second data communication platform 140 in accordance with one embodiment of the present invention. The interface connection 160 couples the first data communication platform 110 with the second data communication platform 140 through the data communication port 125 of the first data communication platform 110 and the data communication port 145 of the second data communication platform 140. However, it should be appreciated by one skilled in the art that the interface connection 160 may be of any type of interface connection known in the art such as but not limited to a data communication bus between the first data communication platform 110 and the second data communication platform 140.

It should be appreciated by one skilled in the art that the first data communication platform 110 may be utilized to communicate between networked computer devices (not shown) without being coupled to the second data communication platform 140. However, since the first data communication platform utilizes protocols developed and implemented in software allowing for flexibility in developing and adding new protocols, the first data communication platform 110 is slower in data signal communication as compared to the second data communication platform 140.

Also, it should be appreciated by one skilled in the art that the second data communication platform 140 may also be utilized to communicate between networked computer devices (not shown) without being coupled to the first data communication platform 140. However, since the second data communication platform 140 incorporates protocols developed and implemented in ASICs providing faster data signal communication between networked computer devices as compared to protocols developed and implemented as software, the second data communication platform 140 is less flexible in updating protocols as compared to the first data communication platform.

In one embodiment, the first data communication platform 110 and the second data communication platform 140 may be combined on a single integrated circuit board (not shown). In one embodiment, the first data communication platform 110 and the second data communication platform 140 may be on separate integrated circuit boards (not shown). In one embodiment, multiple second data communication platforms are arranged in a stacked configuration with the first data communication platform interface connected to the stack. A variety of alternate arrangements of the first and second data communication platforms are possible.

As will be discussed in further detail below, the interface connection 160, in accordance with one embodiment of the present invention, couples the first data communication platform 110 and the second data communication platform 140 to combine protocols developed and implemented in ASICs, providing fast data signal communication capabilities, with protocols developed and implemented in software, providing flexibility in developing and adding new protocols as needed by more complex networked computer devices.

Figure 2:
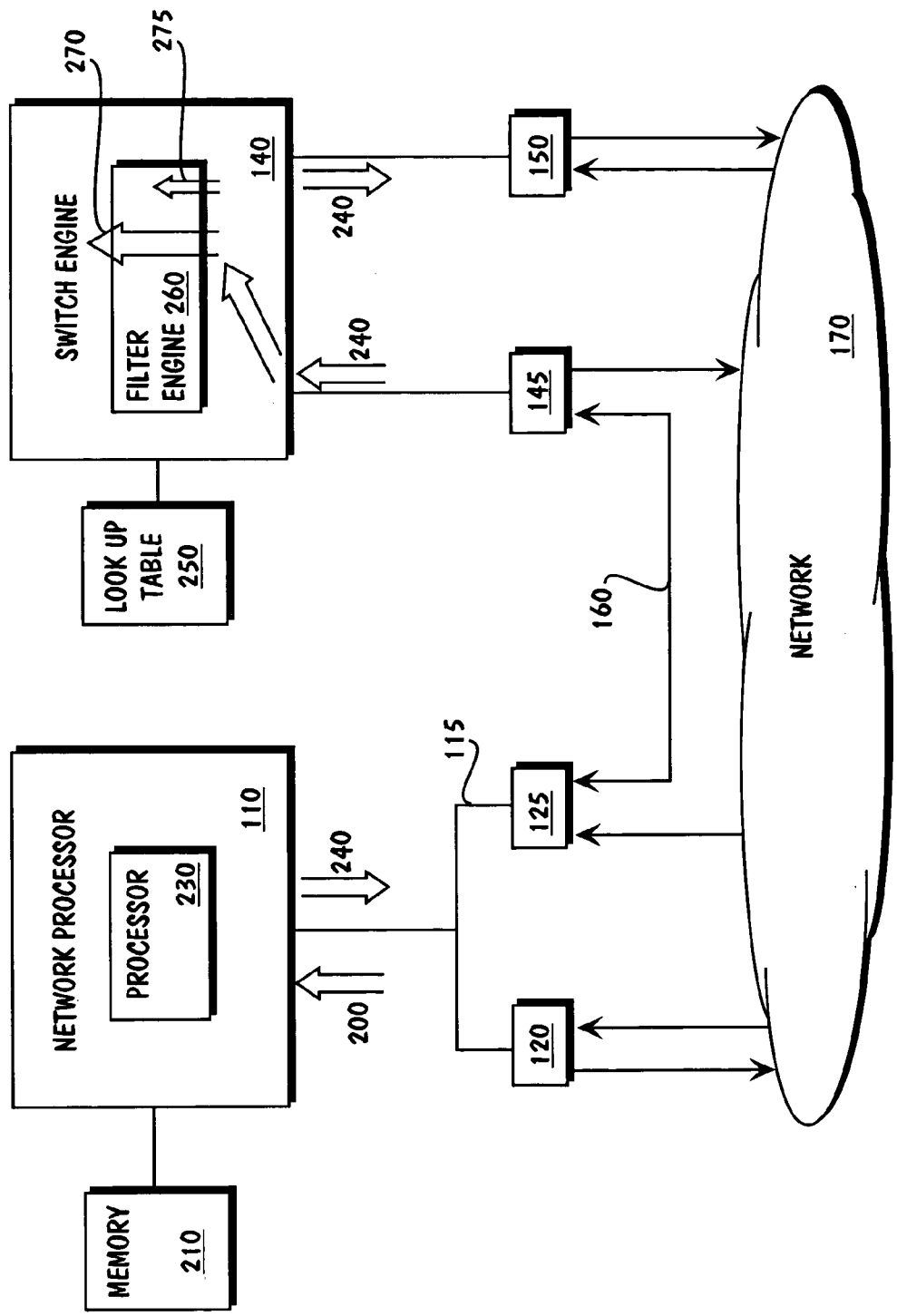
FIG. 2 illustrates a block diagram of the first data communication platform and the second data communication platform coupled to provide fast and flexible data signal communication between networked computer devices in accordance with one embodiment of the present invention.

FIG. 2 illustrates more detail of one embodiment of the first data communication platform and the second data communication platform coupled to provide fast and flexible data signal communication between networked computer devices.

The first data communication platform 110 of FIG. 2 includes, among other components (not shown), a memory 210 and a processor 230. The processor 230 may be a complex instruction set computer (CISC) microprocessor, a reduced instruction set computing (RISC) microprocessor, a very long instruction word (VLIW) microprocessor, a processor implementing a combination of instruction sets, or other processor device. The memory 210 may be a dynamic random access memory (DRAM) device, a synchronous direct random access memory (SDRAM) device, a Flash memory device, or other memory device. The memory 210 may store instructions and code represented by data signals that may be executed by the processor 230. Additionally, the memory may also store data communication protocols and instructions for supporting the communication protocols.

In FIG. 2, the second data communication platform 140 includes, among other components (not shown), a "look-up table" 250, a filter engine 260, and a by-pass path 270 of the filter engine 260. The filter engine 260 filters data signals by comparing received data signals formatted according to data communication protocols to data communication protocols stored in the "look-up table" 250 and determining if the data signals are formatted according to a data communication protocol that the second data communication platform 140 can support. Stored in the "look-up table" 250 may be data communication protocols and instructions for supporting the data communication protocols by the second data communication platform 140. The manner in which filters perform the filtering functions are know in the art, and therefore, need not be discussed in further detail.

The by-pass path 270 is an electronic path through the filter engine 260, where a signal will be routed through the filter engine 260 without being processed by the filter engine 260. Data signals are routed through the by-pass path 270, by-passing the filter engine 260, when an indication to do so is received by the second data communication platform 140. Once the data signals are received and routed through the by-pass path 270 of the filter engine 260 according to one embodiment of the present invention, the data signals are received by other components (not shown) of the second data communication platform, and then, processed and transmitted out of the second data communication platform by methods known in the art.

Additionally, shown in FIG. 2, the second data communication platform includes a filter path 275 of the filter engine 260. By routing data signals through the filter path 275, the filter engine 260 filters data signals by comparing received data signals formatted according to data communication protocols to the data communication protocols stored in the "look-up table" 250 and determining if the data signals are formatted according to a data communication protocol that the second data communication platform 140 can support. The manner in which the data signals are filtered may be in any manners known in the art, and when the data signals are received and routed through the filer path 275 of the filter engine 260 according to one embodiment of the present invention, the data signals are received by other components (not shown) of the second data communication platform, and then, processed and transmitted out of the second data communication platform by methods known in the art.

The first data communication platform 110 may also be comparing received data signals formatted according to data communication protocols to the data communication protocols stored in the "look-up table" 250 in order to determine if the second data communication platform 140 supports a data signal received by the first data communication platform.

In one embodiment of the present invention of FIG. 2, a data signal 200 formatted according to a data communication protocol is sent to the first data communication platform 110 from the network 170 through the data communication port 120. The processor 230 executes instructions stored in the memory 210, and the executed instructions operate to receive the data signal 200 formatted according to the data communication protocol. The processor 230 of the first data communication platform 110 determines if the data communication protocol is supported by the first data communication platform 110 by comparing the data communication protocol with data communication protocols which may be pre-stored in the memory 210. If it is determined that the data communication protocol is supported by the first data communication platform 110, the processor 230 indicates to the second data communication platform 140 to receive the data signal 240 at the by-pass path 270 of the filter engine 260 included in the second data communication platform 140.

The indication may be in the form of the processor 230 tagging header information to the data signal 240. By tagging the header information to the data signal 240, the second data communication platform 140 receives the data signal 240 at the by-pass path 270 and routes the data signal 240 through the filter engine 260 to other components (not shown) in the second data communication platform 140. Once the other components (not shown) of the second data communication platform receives the data signal 240, which was routed through the by-pass path 270 in accordance with one embodiment of the present invention, the other components (not shown) process and transmit the data signal out of the second data communication platform by methods known in the art, based on the header information, to the network 170 through the data communication port 150. It should be appreciated by one skilled in the art that tagging the header information to the data signal may be done according to any methods known in the art.

Thus, fast data signal communication capabilities of protocols developed and implemented in ASICs are combined with the flexibility in developing and adding new protocols implemented in software as needed by more complex networked computer devices.

In one embodiment, the processor 230 of the first data communication platform 110 determines if the data communication protocol is supported by the second data communication platform 140 by comparing the data communication protocol with data communication protocols which may be pre-stored in the "look-up table" 250. If it is determined that the data communication protocol is supported by the second data communication platform 140, the processor 230 indicates to the second data communication platform to receive the data signal 240 at the filter path 275 of the filter engine 260 included in the second data communication platform.

As discussed above, the indication may be in the form of the processor 230 tagging header information to the data signal 240. By tagging the header information to the data signal, the second data communication platform 140 receives the data signal 240 at the filter path 275 and filters the data signal 240 through the filter engine 260 to other components (not shown) in the second data communication platform 140. Once the other components (not shown) of the second data communication platform receives the data signal 240, which was filtered through the filter path 270 in accordance with one embodiment of the present invention, other components (not shown) process and transmit the data signal out of the second data communication platform by methods known in the art to the network 170 through the data communication port 150.

As a result, fast data signal communication capabilities of protocols developed and implemented in ASICs are combined with the flexibility in developing and adding new protocols implemented in software as needed by more complex networked computer devices.

Figure 3:
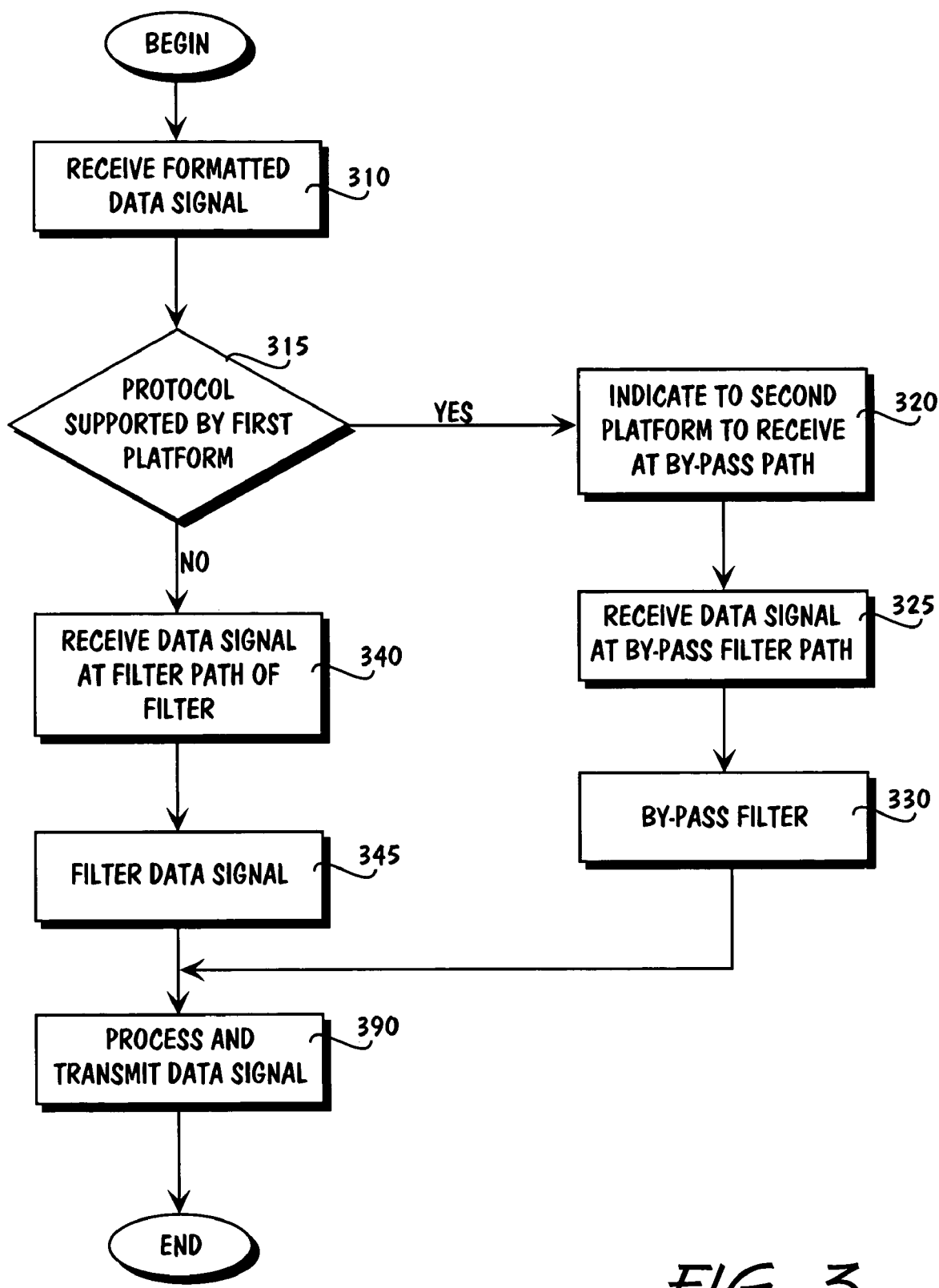
FIG. 3 illustrates an operational flow of one embodiment of the present invention.

FIG. 3 illustrates an operational flow of one embodiment of the present invention. In FIG. 1, a first data communication platform receives a data signal formatted according to a data communication protocol, 310. The first data communication platform determines if the data communication protocol of the data signal is supported by the first data communication platform, 315.

If it is determined that the data communication protocol of the data signal is supported by the first data communication platform, the first data communication platform indicates to a second data communication platform to receive the data signal at a by-pass path of a filter engine of the second data communication platform, 320. The data is received at by-pass path of the filter engine of the second data communication path, 325, and the data is signal routed through the by-pass path, by-passing the filter engine of the second data communication platform 330. Once the data signals are received and routed through the by-pass path of the filter engine, according to one embodiment of the present invention, the data signals are received by other components (not shown) of the second data communication platform, and then, processed and transmitted out of the second data communication platform by methods known in the art, 390.

If it is determined that the data communication protocol of the data signal is not supported by the first data communication platform, 315, the data signal is received at a filter path of the filter engine of the second data communication platform, 340. The filter engine filters the data signal by comparing the protocols stored in the "look-up table" and determining if the data signal is formatted according to a data communication protocol that the second data communication platform can support, 345. Once the data signals are received and routed through the filter path of the filter engine according to one embodiment of the present invention, the data signals are received by other components (not shown) of the second data communication platform, and then, processed and transmitted out of the second data communication platform by methods known in the art, 390.

In an alternate embodiment, in block, 315, rather than, and/or in addition to, determining if the data is not supported by the first data communication platform, the first data communication platform determines if the data communication protocol is supported by the second data communication platform. In which case, if it is determined that the data communication protocol is supported by the second data communication platform, the data signal is received at a filter path of the filter engine of the second data communication platform, 340, and continues through the operational flow. However, if it is determined that the data communication protocol is not supported by the second data communication platform, the first data communication platform determines if the data communication protocol is supported by the first data communication platform as shown in block, 315, and continues through the operational flows of the embodiment shown in FIG. 3.

The operational flow of FIG. 3 allows for faster data signal communication capabilities of protocols developed and implemented in ASICs to be combined with the flexibility in developing and adding new protocols implemented in software needed by more complex networked computer devices.

Figure 4:
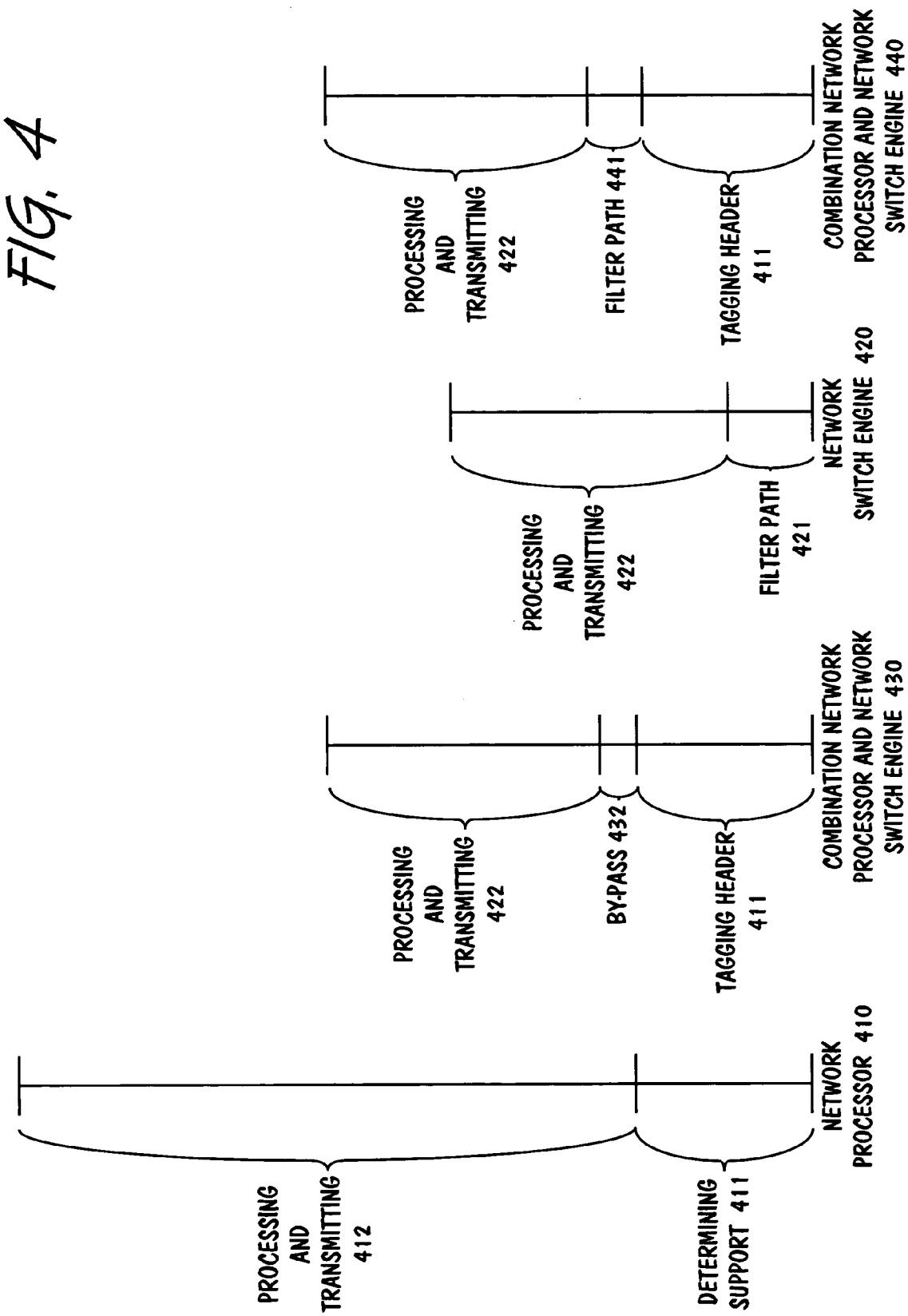
FIG. 4 illustrates graphical representations of comparing relative performance time lines of the first data communication platform, the second data communication platform, and the combinations of the two types of data communication platforms

FIG. 4 illustrates graphical representations of comparing relative performance time lines of the first data communication platform, the second data communication platform, and the combinations of the two types of data communication platforms.

In FIG. 4, a graph representing a relative performance time line for a first data communication platform 410, which may be a network processor functioning alone, is shown. The network processor may utilize data communication protocols developed and implemented in software. The relative performance time line for the first data communication platform 410 shows a relative time indication for receiving a data signal formatted according to a data communication protocol and determining if the data communication protocol is supported by first data communication platform, 411. The relative performance time line for the first data communication platform 410 also shows the relative time indication for processing and transmitting the data signal, 412.

In FIG. 4, a graph representing a relative performance time line for a second data communication platform 420, which may be a switch engine functioning alone, is also shown. The switch engine utilizing data communication protocols developed and implemented in ASICs. The relative performance time line for the second data communication platform 430 shows the relative time indication for receiving a data signal formatted according to a data communication protocol at a filter path and filtered, 421. The relative performance time line for the first data communication platform 420 also shows the relative time indication for processing and transmitting the data signal, 422.

As illustrated in FIG. 4, the relative performance time lines for the first data communication platform 410 and the second data communication platform 420, each functioning alone, illustrate faster relative performance time lines for the second data communication platform. The processing and transmitting relative time indication 422 of the second data communication platform is relatively faster as well, due in part to the second data communication platform utilizing data communication protocols implemented in ASICs.

Additionally, shown in FIG. 4 is a graph representing a relative performance time line for a combination of the first data communication platform and the second data communication platform 430, in accordance with one embodiment of the present invention. A graph representing an alternate embodiment 440 of the present invention for combining the first data communication platform and the second data communication platform is also shown.

For the graphs representing combined platforms 430 and 440, the relative time indications for determining and indicating to the second data communication platform are similar 411 and are both performed in the first data communication platform. Additionally, the relative time indications for processing and transmitting data signals are similar 422 and are both performed in the second data communication platform. However, the graphs representing combined platforms 430 and 440 include a relative time indication for a by-pass path 432 and a relative time indication for a filter path 441, both performed in the second data platform.

As illustrated in FIG. 4, the relative performance time lines for the combined data communication platforms are relatively faster than the first data communication platform functioning alone 410. Thus, FIG. 4 graphically illustrates fast data signal communication capabilities of protocols developed and implemented in ASICs combined with flexibility in developing and adding new protocols implemented in software needed as by more complex networked computer devices.

Figure 5:
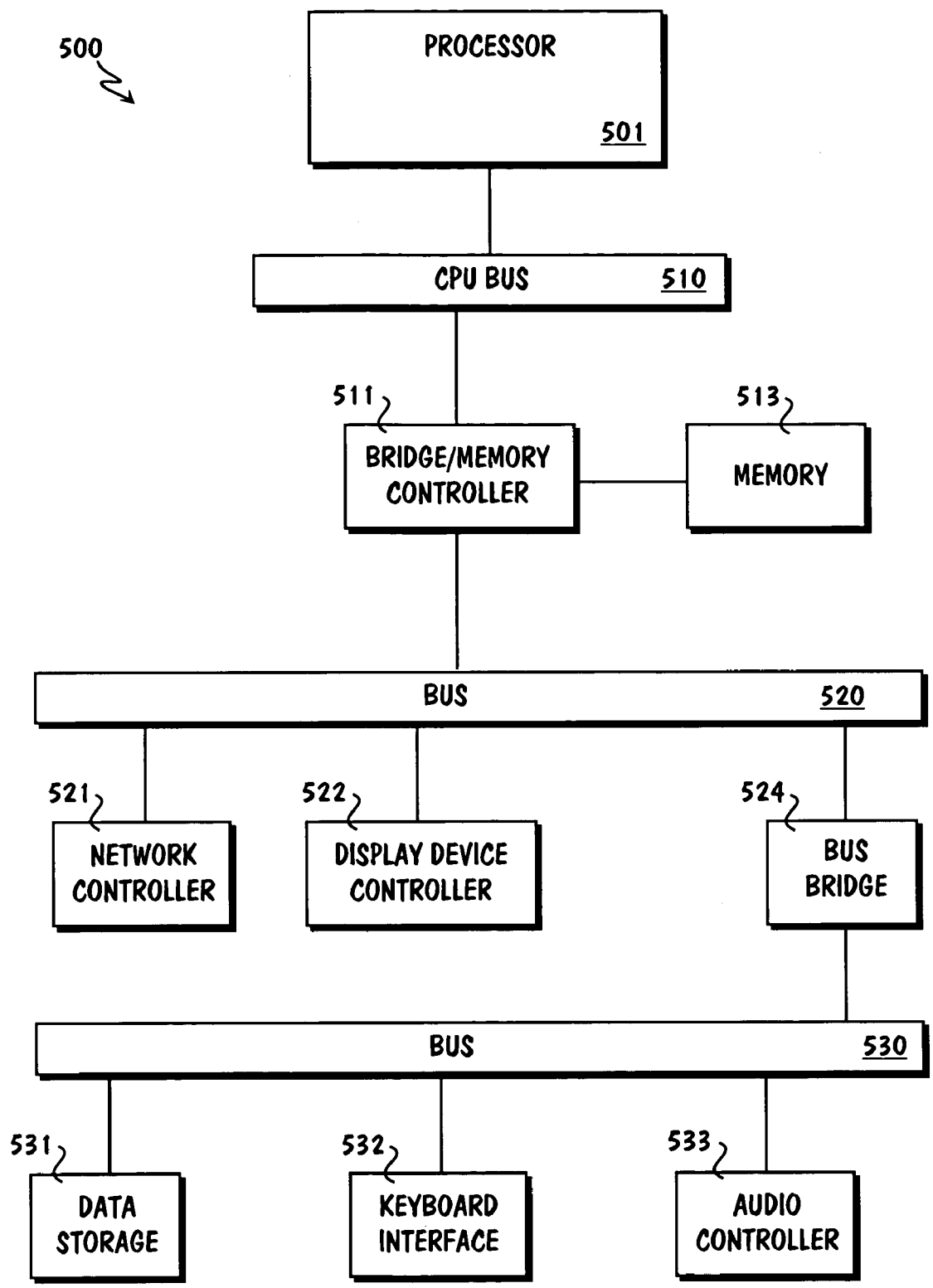
FIG. 5 illustrates a computer system upon which an embodiment of the present invention can be implemented.

FIG. 5 illustrates a computer system 500 upon which an embodiment of the present invention can be implemented. The computer system 500 includes a processor 501 that processes data signals. The processor 501 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 5 shows an example of the present invention implemented on a single processor computer system 500. However, it is understood that the present invention may be implemented in a computer system having multiple processors. The processor 501 is coupled to a CPU bus 510 that transmits data signals between processor 501 and other components in the computer system 500.

The computer system 500 includes a memory 513. The memory 513 may be a dynamic random access memory (DRAM) device, a synchronous direct random access memory (SDRAM) device, or other memory device. The memory 513 may store instructions and code represented by data signals that may be executed by the processor 501.

A bridge/memory controller 511 is coupled to the CPU bus 510 and the memory 513. The bridge/memory controller 511 directs data signals between the processor 501, the memory 513, and other components in the computer system 500 and bridges the data signals between the CPU bus 510, the memory 513, and a first I/O bus 520.

The first I/O bus 520 may be a single bus or a combination of multiple buses. As an example, the first I/O bus 520 may comprise a Peripheral Component Interconnect (PCI) bus, a Personal Computer Memory Card International Association (PCMCIA) bus, a NuBus, or other buses. The first I/O bus 520 provides communication links between components in the computer system 500. A network controller 521 is coupled to the first I/O bus 520. The network controller 521 links the computer system 500 to a network of computers (not shown) and supports communication among the machines. A display device controller 522 is coupled to the first I/O bus 520. The display device controller 522 allows coupling of a display device (not shown) to the computer system 500 and acts as an interface between the display device and the computer system 500. The display device controller 522 may be a monochrome display adapter (MDA) card, a color graphics adapter (CGA) card, an enhanced graphics adapter (EGA) card, an extended graphics array (XGA) card or other display device controller. The display device (not shown) may be a television set, a computer monitor, a flat panel display or other display device. The display device receives data signals from the processor 501 through the display device controller 522 and displays the information and data signals to the user of the computer system 500.

A second I/O bus 530 may be a single bus or a combination of multiple buses. As an example, the second I/O bus 530 may comprise a PCI bus, a PCMCIA bus, a NuBus, an Industry Standard Architecture (ISA) bus, or other buses. The second I/O bus 530 provides communication links between components in the computer system 500. A data storage device 531 is coupled to the second I/O bus 530. The data storage device 531 may be a hard disk drive, a floppy disk drive, a CD-ROM device, a flash memory device or other mass storage device. A keyboard interface 532 is coupled to the second I/O bus 530. The keyboard interface 532 may be a keyboard controller or other keyboard interface. The keyboard interface 532 may be a dedicated device or can reside in another device such as a bus controller or other controller. The keyboard interface 532 allows coupling of a keyboard (not shown) to the computer system 500 and transmits data signals from a keyboard to the computer system 500. An audio controller 533 is coupled to the second I/O bus 530. The audio controller 533 operates to coordinate the recording and playing of sounds.

A bus bridge 524 couples the first I/O bus 520 to the second I/O bus 530. The bus bridge 524 operates to buffer and bridge data signals between the first I/O bus 520 and the second I/O bus 530.

In one embodiment, the first and second data communication platforms are implemented as network controller 521 to link the computer system 500 to a network of computer devices (not shown) and support fast data signal communication capabilities of protocols, developed and implemented in ASICS, combined with the flexibility in developing and adding new protocols implemented in software needed by more complex networked computer devices.

Thus, a method and apparatus for combining fast data signal communication capabilities of protocols developed and implemented as ASICs with the flexibility in developing and adding new protocols implemented as software needed by more complex networked computer devices is described.

Whereas many alterations and modifications of the present invention will be comprehended by one skilled in the art after having read the foregoing description, it is to be understood that the particular embodiments shown and described by way of illustration are in no way intended to be considered limiting. Therefore, references to details for particular embodiments are not intended to limit the scope of the claims.

What is claimed is:

1. A method comprising:
    receiving a data signal formatted according to a data communication protocol at a software data communication platform, the software data communication platform to support one or more data communication protocols;
    determining if the data communication protocol of the data signal is supported by a hardware data communication platform, the hardware data communication platform to support a data communication protocol not supported by the software data communication platform, the hardware data communication platform having a filter engine with a filter path to process a data signal for routing and a by-pass path to route the data signal through the filter engine without processing the data signal by the filter engine; and
    if the data communication protocol of the data signal is supported by the hardware data communication platform, indicating to the hardware data communication platform to receive the data signal at the filter path to process the data signal with the hardware data communication platform, or else to receive the data signal at the by-pass path to process the data signal with the software data communication platform.

2. A method according to claim 1, wherein the hardware communication protocol includes one or more application specific integrated circuits (ASICs).

3. A method according to claim 1, wherein determining if the data communication protocol of the data signal is supported by the hardware data communication platform comprises comparing the data communication protocol of the data signal to a data communication protocol included in a lookup table indicating the data communication protocols supported by the hardware data communication platform.

4. A method according to claim 3, wherein the lookup table is stored on the hardware data communication platform.

5. A method according to claim 1, wherein indicating to the hardware data communication platform to receive the data signal at the filter path or the by-pass path comprises tagging header information to the data signal to indicate the path.

6. An article of manufacture comprising:
    a storage medium having stored therein a plurality of machine-executable instructions, which when executed, cause a machine to perform operations including:
    receiving a data signal formatted according to a data communication protocol at a software data communication platform, the software data communication platform to support one or more data communication protocols;
    determining if the data communication protocol of the data signal is supported by a hardware data communication platform, the hardware data communication platform to support a data communication protocol not supported by the software data communication platform, the hardware data communication platform having a filter engine with a filter path to process a data signal for routing and a by-pass path to route the data signal through the filter engine without processing the data signal by the filter engine; and
    if the data communication protocol of the data signal is supported by the hardware data communication platform, indicating to the hardware data communication platform to receive the data signal at the filter path to process the data signal with the hardware data communication platform, or else to receive the data signal at the by-pass path to process the data signal with the software data communication platform.

7. An article of manufacture according to claim 6, wherein the hardware communication protocol includes one or more application specific integrated circuits (ASICs).

8. An article of manufacture according to claim 6, wherein the instructions to cause determining if the data communication protocol of the data signal is supported by the hardware data communication platform comprises instructions to cause comparing the data communication protocol of the data signal to a data communication protocol included in a lookup table indicating the data communication protocols supported by the hardware data communication platform.

9. An article of manufacture according to claim 8, wherein the lookup table is stored on the hardware data communication platform.

10. An article of manufacture according to claim 6, wherein the instructions to cause indicating to the hardware data communication platform to receive the data signal at the filter path or the by-pass path comprises instructions to cause tagging header information to the data signal to indicate the path.

11. An apparatus comprising:
a network processor to execute a software data communication platform, the software data communication platform to support one or more data communication protocols, the software data communication platform to receive a data signal formatted according to a data communication protocol, and determine if the data communication protocol of the data signal is supported by a hardware data communication platform; and
a network switch circuit coupled to the network processor to include an application specific integrated circuit (ASIC) to execute a hardware data communication platform, the hardware data communication platform to support a data communication protocol not supported by the software data communication platform, the hardware data communication platform having a filter engine with a filter path to process a data signal for routing and a by-pass path to route the data signal through the filter engine without processing the data signal by the filter engine, the network switch circuit to receive the data signal at the filter path to process the data signal with the hardware data communication platform if the network processor indicates the data communication protocol of the data signal is supported by the hardware data communication platform, or else to receive the data signal at the by-pass path to process the data signal with the software data communication platform if the network processor indicates the data communication protocol of the data signal is not supported by the hardware data communication platform.

12. An apparatus according to claim 11, the network processor to determine if the data communication protocol of the data signal is supported by the hardware data communication platform comprises the network processor to compare the data communication protocol of the data signal to a data communication protocol included in a lookup table indicating the data communication protocols supported by the hardware data communication platform.

13. An apparatus according to claim 12, wherein the lookup table is stored on the ASIC.

14. An apparatus according to claim 11, wherein the instructions to cause indicating to the hardware data communication platform to receive the data signal at the filter path or the by-pass path comprises instructions to cause tagging header information to the data signal to indicate the path.

* * * * *